United States Patent

Himmler

[11] 3,981,174
[45] Sept. 21, 1976

[54] METHOD OF AND DEVICE FOR TESTING THE SHOCK ABSORBERS OF A VEHICLE

[75] Inventor: Gunther Himmler, Darmstadt, Germany

[73] Assignee: Gebr. Hofmann KG, Darmstadt, Germany

[22] Filed: Sept. 19, 1975

[21] Appl. No.: 614,957

[30] Foreign Application Priority Data
Sept. 23, 1974 Germany............................ 2445406

[52] U.S. Cl. .................................................. 73/11
[51] Int. Cl.² ........................................ G01M 17/04
[58] Field of Search .............................. 73/11, 67.1

[56] References Cited
UNITED STATES PATENTS

| | | | |
|---|---|---|---|
| 2,873,604 | 2/1959 | Samsel | 73/67.1 |
| 3,855,841 | 12/1974 | Hunter | 73/11 |
| 3,902,352 | 9/1975 | Buzzi | 73/11 |

FOREIGN PATENTS OR APPLICATIONS

| | | | |
|---|---|---|---|
| 900,272 | 7/1962 | United Kingdom | 73/67.1 |

*Primary Examiner*—Charles A. Ruehl
*Attorney, Agent, or Firm*—Cushman, Darby & Cushman

[57] ABSTRACT

A method and apparatus for testing shock absorbers installed on vehicles whereby one tire of the vehicle is placed on a supporting plate of a test stand which is oscillated. The velocity of the plate during oscillation and the dynamic tire pressure on the supporting plate are detected and corresponding signals produced. The signals are divided, one by the other, after being peak rectified to produce a quotient which represents tire quality signal. Resonance is detected by differentiation of the velocity signal and the tire quality signal transmitted to an indicator only during resonance.

6 Claims, 3 Drawing Figures

METHOD OF AND DEVICE FOR TESTING THE SHOCK ABSORBERS OF A VEHICLE

The invention relates to a method of testing the shock absorbers of a vehicle after installation, whereby one vehicle wheel is caused to oscillate and the wheel footprint pressure measured with the resonance of the oscillating system, and to an approach for testing installed shock absorbers with an oscillating wheel supporting plate, the oscillation of which can be detected by a force pick-up transducer.

German Pat. application No. 1,648,546 describes a test instrument for shock absorbers of vehicles in which the wheel load is supported on a rigid counterbearing through a spring, and a motor-driven, circulating mass is arranged on the supporting plate of the vehicle wheel. The latter plate is oscillated by the circulating mass to introduce resonance oscillations into the suspension system of the vehicle. The amplitudes of these oscillations are detected and indicated by a measuring system.

With these instruments, only an indirect value, the oscillation amplitude, is measured. The amplitude is, however, only indirectly proportional to the condition of the absorber to be tested. Therefore, the functioning of the shock absorber under test can be examined only indirectly. The relation between amplitude and shock absorption has the shape of a hyperbola and that part of the curve which is most important for evaluating the quality of the shock absorber is very flat. The possibility of error in the evaluation is, therefore, great. Further, the amplitude is usually recorded graphically and the analysis of this record can be very intricate and time-consuming.

A further method of and apparatus for testing shock absorbers of motor vehicles has become known (German Pat. application No. 2,254,272), in which a wheel is fitted on an oscillating wheel supporting plate which is pivoted at one end. With this known testing device, between the drive for the wheel supporting plate and the wheel supporting plate, further springs are provided which compensate for different tire characteristics. The oscillations are measured by transducers such as acceleration or force pick-up transducers and indicated directly. This method, too, has the disadvantage that only indirect values are derived for evaluating the quality of the shock absorber. These values are only indirectly proportional to the absorbing method of the shock absorber which has, as mentioned above, a hyperbola curve which does not permit a sufficiently exact evaluation with this type of prior art device.

It is the object of this invention to provide a method of and an apparatus for testing the quality of installed shock absorbers of vehicles whereby a measured variable is obtained which is directly proportional to the quality of the shock absorber and is available at an output as a direct indication value.

This is achieved according to this invention, in that, besides the wheel footprint force, the oscillation velocity is measured and the wheel footprint force is divided by the oscillation velocity.

The above-mentioned object is furthermore achieved with an apparatus whereby, in addition to the force-measuring pick-up, a velocity pick-up is provided which detects the velocity of oscillation of the wheel supporting plate, and the force-measuring pick-up and the velocity pick-up are coupled to a divider circuit.

Subsequent to the divider an indicating instrument can be provided which indicates the quotient of wheel footprint force and oscillation velocity only when there is a resonance of the oscillating system. For determining the resonance of the oscillating system two differentiators and one first comparator can be subsequently series-connected to the velocity pick-up. An additional second comparator is connected to the output of the first differentiator. In addition, an AND gate can be connected to the outputs of each of the two comparators so that in the event that the first comparator and second comparator both have a suitable output, a further gate is excited in such a way that the output of the divider is connected with the input of the indicating instrument to provide an indication.

In addition, the velocity pick-up can be designed as an acceleration pick-up with a subsequent integrator attached thereto. The output values of the velocity pick-up and of the force-measuring pick-up can be fed to the divider through peak-value rectifiers.

The invention features the advantage that a direct measurement of the quality of the shock absorber to be tested is obtained. This measurement is the quotient from wheel footprint force and the oscillation velocity of the oscillating system, and can also be defined as the impedance of the oscillating system. It equals the dampening of the vehicle shock absorber.

The enclosed figures show a preferred embodiment of the invention, and serve for explaining more in detail the invention:

Figure 1:
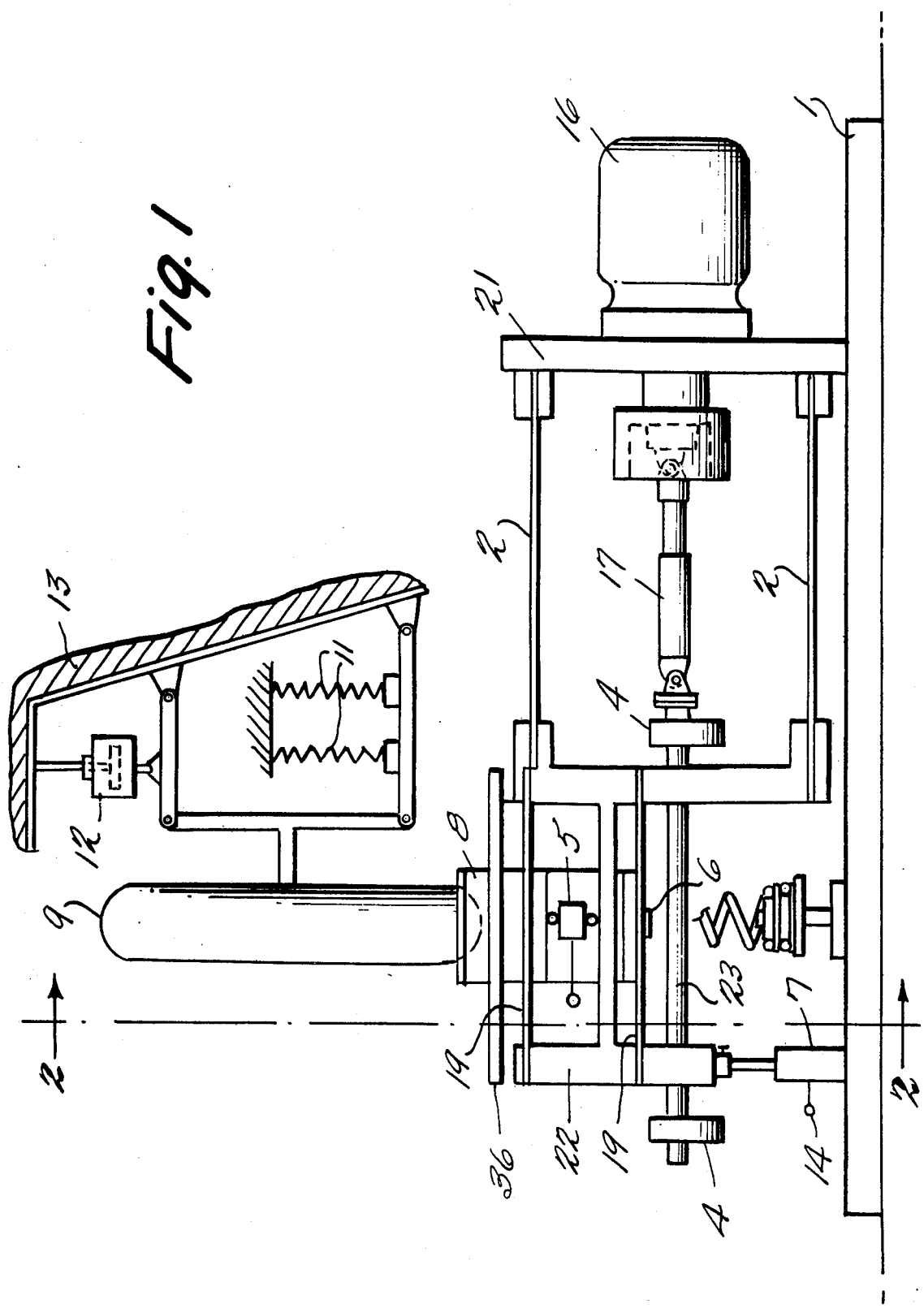
FIG. 1 shows a side view of a test stand according to this invention.
Figure 2:
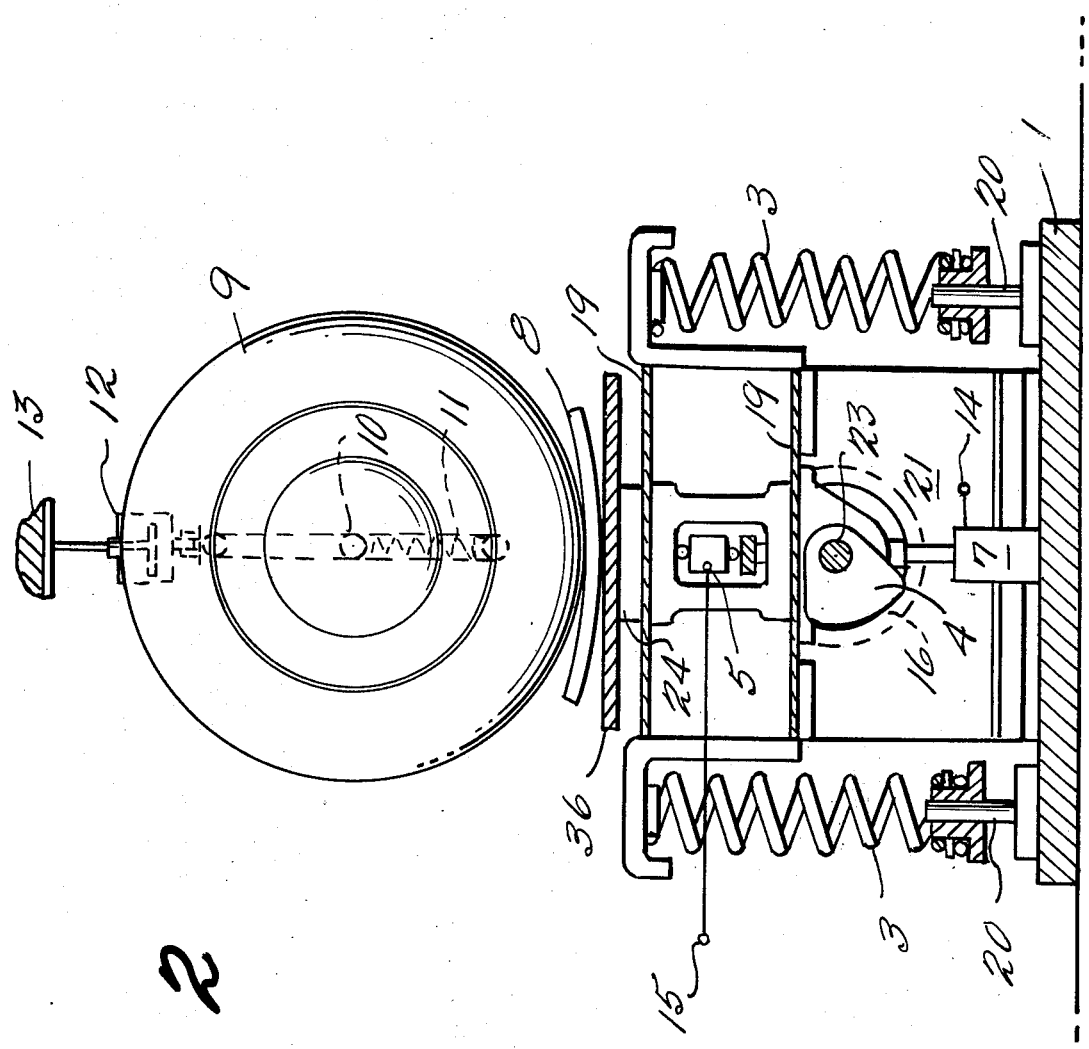
FIG. 2 shows a sectional view of the test stand along the lines 2—2 in FIG. 1.

FIGS. 1 and 2 show the vehicle as a simulated mass 13. Of this vehicle a wheel 9, a wheel bearing 10, a vehicle spring suspension 11, and a shock absorber 12 to be tested are schematically shown. The vehicle wheel 9 rests on a wheel supporting plate 8 which is represented as a ball socket.

The test stand comprises a base plate 1 and a side plate 21 (FIG. 2) onto which are preferably clamped two flat guide springs 2. At the other end of of the parallel guide springs 2 a support 22 is provided. Support 22 journals a shaft 23 with unbalance generators 4. Preferably two unbalance generators 4 are provided on the opposite sides of support 22, as shown in FIG. 2. Shaft 23 and unbalance generators 4 arranged thereon, the size of which can be adjustable, are driven by stationary drive motor 16 through a cardan shaft 17. The conventional drive motor 16 can be switched by suitable controls from counter-clockwise to clockwise rotation. In support 22 two parallel guide springs 19 are preferably provided. In the middle of the second guide springs 19 a second support 24 is arranged which is provided with a cover plate 36 and serves as a connection between the two parallel guide springs 19. The wheel supporting plate 8 is rigidly attached to the cover plate 36 by any suitable means.

A conventional force-value pick-up or transducer 5 is arranged between the cross connection of the first support 22 and one guide spring 19. This pick-up can be biased by an adjustment device 6. A velocity pick-up 7 is provided between the first support 22 and the base plate 1; it can consist of an acceleration-value pick-up and a subsequent integrator which receives an electrical acceleration signal and integrates it to produce an electrical signal indicating velocity.

For the absorption and compensation of the vehicle weight springs 3 are arranged between the plate 1 and second support 24. In an advantageous way springs 3 can be arranged on both sides of the testing device as clearly shown in FIG. 2. An adjusting device in the shape of a spindle 20 can be provided so that it is possible to handle different vehicle weights. At the outputs 14 and 15 the voltages generated by the force-value pick-up 5 and the velocity pick-up 7 are tapped and coupled to an appropriate circuit such as shown in FIG. 3.

Figure 3:
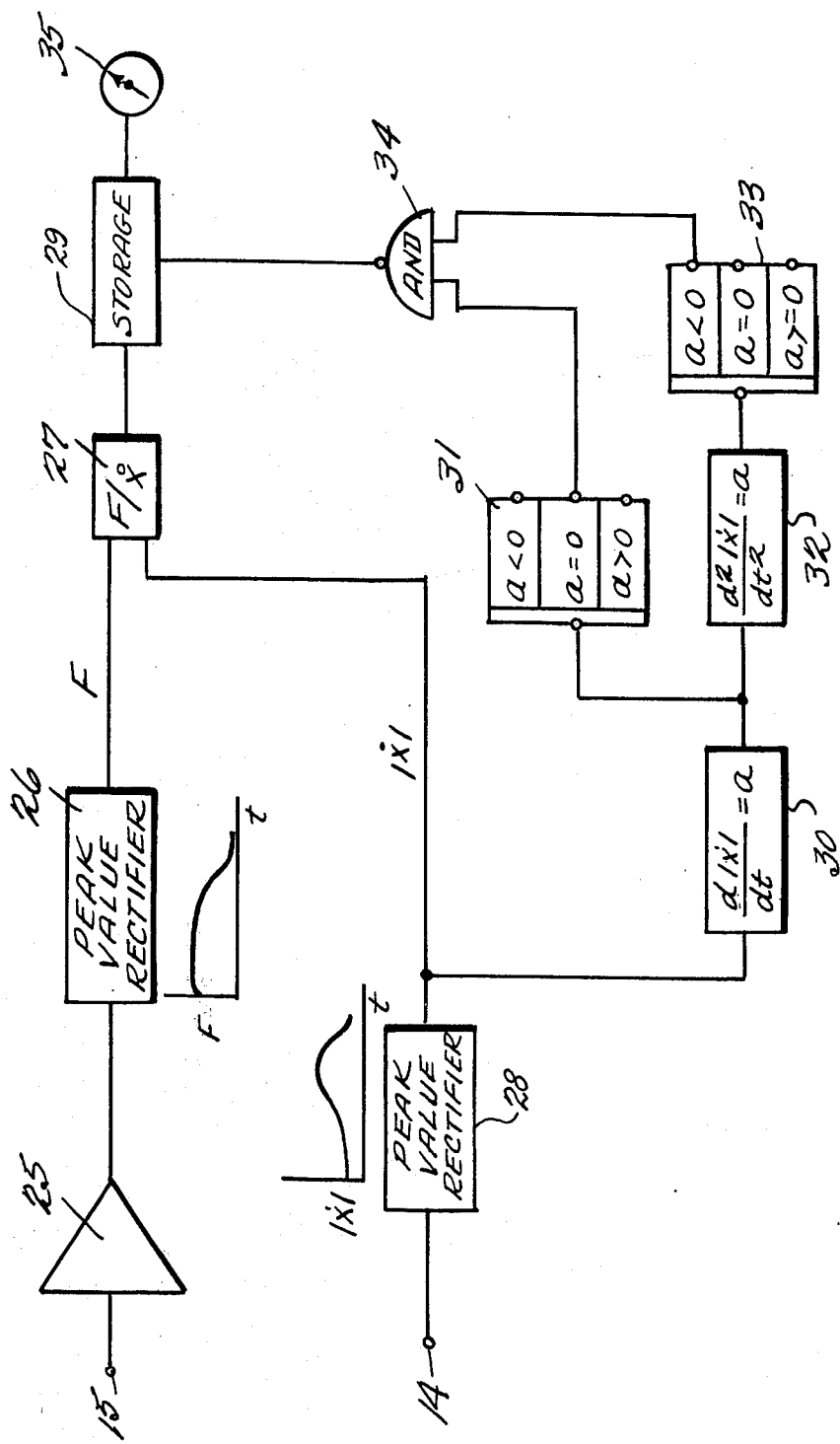
FIG. 3 shows block circuit diagram of a circuit for producing a quality indication from signals produced by FIGS. 1 and 2.

FIG. 3 shows an evaluating circuit for the voltages applied to the inputs 14 and 15. The voltage of the velocity pick-up 7 is applied to the output 14 and the voltage of the force-value pick-up 5 is applied to the output 15. As mentioned before, the velocity pick-up can be an acceleration pick-up the output voltage of which is integrated in the evaluating circuit shown in FIG. 3 prior to further processing.

Amplifier 25 is connected to the output 15 of the force-value pick-up 5. The output of the amplifier 25 is connected in turn to a divider circuit 27 through a peak-value rectifier 26. The output voltage of the velocity pick-up 7, tapped at the output 14 is applied to the input of a second peak-value rectifier 38. The output of peak-value rectifier 28 is connected to the second input of divider 26. The output of the divider 27 is connected to a storage circuit 29 to the output of which a conventional indicating instrument 35 such as a meter is connected. In addition, the evaluating circuit shown in FIG. 3 is provided with series-connected differentiators 30 and 32 which are connected to the output of peak-value rectifier 28. At the output of differentiator 30 a comparator 31 is connected, and at the output of the other differentiator 32 a second comparator 33 is connected. The output ($a = 0$) of the comparator 31 is connected with AND circuit 34, and the output ($a<0$) of the second comparator 33 is connected with another input of the AND circuit 34. The output of the AND circuit 34 connects to the storing device 29.

The mode of operation of the invention is as follows. An oscillation-simulating system is composed of the vehicle suspension system and the test stand. Considering the frequency range for the measurement of the dampening behavior, the tire is assumed to be sufficiently stiff and the tire dampening as compared with the shock absorber dampening is neglected.

In practice, with a test stand for vehicle shock absorbers, the natural oscillations of the vehicle structure are approximately 1.5 hz and the natural oscillations of the oscillating mass ml which is composed of tire mass, axle mass, and coupled test stand mass, are approximately 6 hz. Thus, during measuring within the resonance range of approximately 6 hz the vehicle structure can be considered as stationary so that the following codition results:

$$m_1 \cdot \ddot{X}_1 + d \cdot \dot{X}_1 + X_1(c_1 + c_2) = m \cdot r \cdot w^2 \cdot \sin wt \qquad (1)$$

$m_1$ = tire mass + axle mass 30 coupled test stand mass
$c_1$ = test stand spring
$c_2$ = vehicle dampening spring
$d$ = dampening of shock absorber
$m \cdot 4 \cdot w^2$ = unbalance exciter force $x_1$ = oscillation path of mass $m_1$
$m$ = mass of unbalance weight The individual terms of the equation (1) can also be defined as forces, viz.

$F_1 = m_1 \cdot \ddot{x}_1$
$F_2 = d \cdot \dot{x}_1$
$F_3 = x_1 (c_1 + c_2)$ and these forces can for their part be defined as speed-dependent quantities; if $\dot{x}$ is equalized with $v$, then:

$F_1 = m \cdot dv/dt$
$F_2 = d \cdot v$

As the oscillation involved are periodic, the following statement can be made:

$v = V \cdot e^{j \omega t}$, and for the forces the general statement can be made: $F_i = F_i \cdot d^{j \omega t}$ $F_1 = j \omega m V$ $$F_3 = \frac{(c_1 + c_2) \cdot V}{j\omega}$$

Starting from this arrangement, the oscillation resistance opposed to a force influence by the mass, the spring or the shock absorber, can be defined as so-called impedance so that $J = F/V$.

As regards the resonance $F_1$ equals $F_3$ so that the measured impedance equals the dampening effected by the vehicle shock absorber.

As the unbalance exciter force is independent of the vehicle suspension system, it is possible, with resonance, to measure the impedance and thus directly the dampening force or the quality of the vehicle shock absorber respectively by measuring the velocity of $m_1$ or that of the shock absorber which must be the same.

The evaluation circuit shown in FIG. 3 operates as follows.

The output voltage of force pick-up 5, available at the output terminal 15, is fed to amplifier 25 and then transmitted as dividend to the divider 27 through the peak value rectifier 26. The output voltage of the velocity pick-up 7 which is available at the output terminal 14, is fed as divisor to the divider 27 through a second peak value rectifier 28. The divider 27 continuously carries out a division of the two input values and transmits them to a switching system (not shown) or the storing device 29 respectively.

From the above-described physical conditions it can be seen that the impedance of the oscillating system equals the dampening of the vehicle shock absorber 12 when the velocity reaches a maximum, i.e. during resonance. For the determining of the maximum value of velocity, i.e. for the determination of the resonance, the output voltage is differentiated in the differentiator 30 subsequent to the peak value rectifier and transmitted to a comparator 31. The latter determines whether the first derivation of the oscillation velocity as a function of time is greater than, equal to, or less than zero. As there is a maximum value only when the second derivation of the oscillation velocity as a function of time is negative, the output voltage of the first differentiator 30 is fed to the second differentiator 32 and then transmitted to the second comparator 33. Only in the event that both conditions are fulfilled (first derivation of oscillation velocity equals zero and second derivation of oscillation velocity less than zero) does the AND circuit 34 respond and activate the storing device 29, which transmits the existing value of the divider 27 to the indicating instrument 35. This value is then indicated as direct value for the quality of the shock absorber.

The indicating instrument 35 can be calibrated in such a way that the grade of efficiency of the vehicle shock absorber 12 to be tested is directly indicated. With the device shown the forces acting on the wheel supporting plate and the oscillation velocity of the oscillating system are measured within the resonance range of the oscillation system and subsequently fed to peak-value rectifiers 26 and 28. The impedance of the oscillating system is determined by the subsequent division in the divider 27; thus a direct measure for the quality of the shock absorber 12 is obtained.

Many changes and modifications in the above-described embodiment of the invention can of course be carried out without departing from the scope thereof. Accordingly, that scope is intended to be limited only by the scope of the appended claims.

What is claimed is:

1. A method of testing shock absorbers installed on a vehicle comprising the steps of:
   oscillating one vehicle wheel of said vehicle supported on a wheel supporting plate of a test stand,
   producing a first signal which varies as a function of wheel footprint dynamic pressure,
   producing a second signal which varies as a function of the oscillation velocity of said wheel supporting plate,
   detecting when resonance is occurring and producing a resonance signal,
   dividing said first and second signals to produce a tire quality signal, and
   producing a tire quality indication from said tire quality signal only when said resonance signal is produced.

2. A method as in claim 1 wherein said step of detecting resonance includes determining when the first differential of the velocity is zero and when the second derivative of the velocity is less than zero.

3. An apparatus for testing shock absorbers installed on a vehicle comprising:
   a test stand,
   a wheel supporting plate mounted on said test stand for receiving one tire of said vehicle,
   means for oscillating said plate and tire,
   first means for detecting the velocity of said plate during oscillation and producing a first signal which varies as a function thereof,
   second means for detecting the wheel footprint dynamic pressure and producing a second signal which varies as a function thereof,
   means connected to said first and second detecting and producing means for dividing one of said signals by the other signal and producing a quotient signal,
   means connected to said dividing means for receiving said quotient signal and producing a quality indication signal,
   means for detecting resonance and producing a resonance signal, and
   logic means connected to said resonance detecting and producing means and to said receiving and producing means for producing said indication signal only when said resonance signal is produced.

4. An apparatus as in claim 3 wherein said receiving means includes an indicator and means connected to said indicator for storing said quotient signal and transmitting said quotient signal as said quality signal only when said resonance signal is produced.

5. An apparatus as in claim 4 wherein said resonance detecting and producing means includes first means for differentiating said signal to produce a first differential signal, means for comparing said first differential signal with zero and producing a logical one output signal when said first differential signal is substantially zero, second means for differentiating said first differential signal to produce a second differential signal, means for comparing said second differential signal with zero and producing a logical one output signal when said second differential signal is less than zero, and an AND gate having first and second inputs for receiving said logical one signals and connected to said storing and transmitting means to cause transmission only when both inputs are logical ones.

6. An apparatus as in claim 3 wherein each said detecting and producing means includes a transducer and a peak value rectifier connected to said transducer.

* * * * *